United States Patent
Marshall et al.

(10) Patent No.: US 11,794,821 B2
(45) Date of Patent: Oct. 24, 2023

(54) VEHICLE FENDER ASSEMBLY INCLUDING A CHARGE PORT ASSEMBLY

(71) Applicant: Honda Motor Co., Ltd., Tokyo (JP)

(72) Inventors: Stephen James Marshall, Columbus, OH (US); Steve Faria, Marysville, OH (US); Daniel R. Muller, Marysville, OH (US); Patrick J. Ellison, Dublin, OH (US); Taiga Marukawa, Rochester Hills, OH (US); Takashi Nakano, Columbus, OH (US); Akira Futatsuhashi, Wako (JP); Keiichiro Tsuji, Novi, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/671,118

(22) Filed: Feb. 14, 2022

(65) Prior Publication Data

US 2023/0257025 A1    Aug. 17, 2023

(51) Int. Cl.
*B62D 25/18* (2006.01)
*B62D 65/16* (2006.01)
*B60L 53/16* (2019.01)

(52) U.S. Cl.
CPC .............. *B62D 25/18* (2013.01); *B60L 53/16* (2019.02); *B62D 65/16* (2013.01)

(58) Field of Classification Search
CPC ...... B60K 2015/053; B60K 2015/0553; B60K 15/05; B60L 53/16; B62D 25/18; B62D 65/16
See application file for complete search history.

(56) References Cited

U.S. PATENT DOCUMENTS

| | | | | |
|---|---|---|---|---|
| 9,083,163 B2 * | 7/2015 | Tamaoki | ................... | E06B 7/00 |
| 9,586,490 B2 * | 3/2017 | Yamamaru | ............. | B60L 50/16 |
| 9,849,795 B2 * | 12/2017 | Kato | .................... | H01R 13/639 |
| 10,118,481 B1 * | 11/2018 | Burnett | ................. | B60K 15/05 |
| 10,322,635 B2 * | 6/2019 | Meinl | .................... | F16J 15/027 |

(Continued)

FOREIGN PATENT DOCUMENTS

| | | |
|---|---|---|
| CN | 208993777 | 6/2019 |
| CN | 111284571 | 6/2020 |

(Continued)

*Primary Examiner* — Emma K Frick
(74) *Attorney, Agent, or Firm* — Mark E. Duell; RANKIN, HILL & CLARK LLP (57) ABSTRACT

A vehicle fender assembly includes a fender including a body having an outer surface and an inner surface opposite the outer surface. The body defines a body opening. A stiffener is mounted to the body inner surface and is located at the body opening. The stiffener includes stiffener holes sized to receive associated fasteners. A charge port assembly includes a bracket mounted to the stiffener. The bracket includes bracket holes sized to receive the associated fasteners. The bracket holes are over-sized relative to the associated fasteners to allow for positional movement of the charge port assembly on the associated fasteners relative to the body opening. The stiffener includes at least one stiffener locating feature and the bracket includes at least one bracket locating feature adapted to mate with the at least one stiffener feature to ensure proper placement of the bracket on the stiffener relative to the body opening.

16 Claims, 6 Drawing Sheets

(56) References Cited

U.S. PATENT DOCUMENTS

| | | | | |
|---|---|---|---|---|
| 10,688,839 B1* | 6/2020 | Slade | ............... | H04W 76/14 |
| 10,766,379 B2* | 9/2020 | Hwang | ............... | B60L 58/12 |
| 11,025,018 B2* | 6/2021 | Karasawa | ............ | H01R 13/748 |
| 11,230,187 B2* | 1/2022 | Stack | ............... | B60K 15/05 |
| 11,325,486 B2* | 5/2022 | Nakanishi | ............ | B62D 25/105 |
| 11,424,581 B2* | 8/2022 | Stack | ............... | B60Q 1/50 |
| 11,456,554 B2* | 9/2022 | Springer | ............ | E05B 83/34 |
| 11,459,036 B2* | 10/2022 | Nakanishi | ............ | B62D 25/12 |
| 2019/0386433 A1 | 12/2019 | Masaki | | |
| 2020/0062111 A1* | 2/2020 | Wang | ............... | B60K 15/04 |

FOREIGN PATENT DOCUMENTS

| | | |
|---|---|---|
| CN | 210761009 | 6/2020 |
| CN | 211893422 | 11/2020 |
| CN | 212220400 | 12/2020 |
| JP | 5418473 | 2/2014 |

* cited by examiner

VEHICLE FENDER ASSEMBLY INCLUDING A CHARGE PORT ASSEMBLY

BACKGROUND

Electrified vehicles, like plug-in hybrid electrified vehicles and battery electrified vehicles, can charge a traction battery from an external power source. By way of example, a user can plug a charger into a charge port assembly of the electrified vehicle so that power can move from an external charging system to the traction battery. There is no universal standard for where the charge port assembly is located on the electrified vehicle. Some electrified vehicles can secure the charge port assembly within a fender at a fender opening, thereby providing the user a known location on the electrified vehicle for charging.

BRIEF DESCRIPTION

According to one aspect, a fender assembly for a vehicle comprises a fender including a body having an outer surface and an inner surface opposite the outer surface. The body defines a body opening. A stiffener is mounted to the inner surface of the body and is located at the body opening. The stiffener includes stiffener holes sized to receive associated fasteners. A charge port assembly includes a bracket mounted to the stiffener. The bracket includes bracket holes sized to receive the associated fasteners. The bracket holes are over-sized relative to the associated fasteners to allow for positional movement of the charge port assembly on the associated fasteners relative to the body opening. The stiffener includes at least one stiffener locating feature and the bracket includes at least one bracket locating feature adapted to mate with the at least one stiffener feature to ensure proper placement of the bracket on the stiffener relative to the body opening.

According to another aspect, a fender assembly for a vehicle comprises a fender including a body having an outer surface and an inner surface opposite the outer surface. The body defines a body opening. A stiffener is mounted to the inner surface of the body and is located at the body opening. The stiffener includes a first side portion, a second side portion opposite the first side portion, a first end portion, and a second end portion opposite the first end portion. The stiffener includes a stiffener opening aligned with the body opening. A charge port assembly includes a bracket mounted to the stiffener. The bracket includes a base wall and an outer sidewall extended along a periphery of the base wall. The base wall includes a bracket opening aligned with the stiffener opening. The stiffener includes first and second stiffener locating features and the bracket includes corresponding first and second bracket locating features adapted to mate with the first and second stiffener locating features. The first stiffener locating feature is extended in a first direction on the stiffener and the second stiffener locating feature is extended in a second differing direction on the stiffener to provide two directional locators on the fender assembly to ensure proper placement of the bracket on the stiffener relative to the body opening.

According to another aspect, a method for assembling a charge port assembly on a vehicle fender is provided. The exemplary method comprises providing the fender; punching an opening through a body of the fender; providing a stiffener having a stiffener opening and positioning the stiffener on an inner surface of the fender body such that the stiffener opening is aligned with the fender body opening, wherein the stiffener includes first and second stiffener locating features; securing the stiffener to fender body; providing a bracket of the charge port assembly, the bracket having a bracket opening and first and second bracket locating features; positioning the bracket on the stiffener such that the first and second bracket locating features mate with the corresponding first and second stiffener locating features and the bracket opening is aligned with the stiffener opening; and fastening the bracket and the stiffener to the fender body.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures. Moreover, any term of degree used herein, such as "substantially," means a reasonable amount of deviation of the modified word is contemplated such that the end result is not significantly changed.

Figure 1:
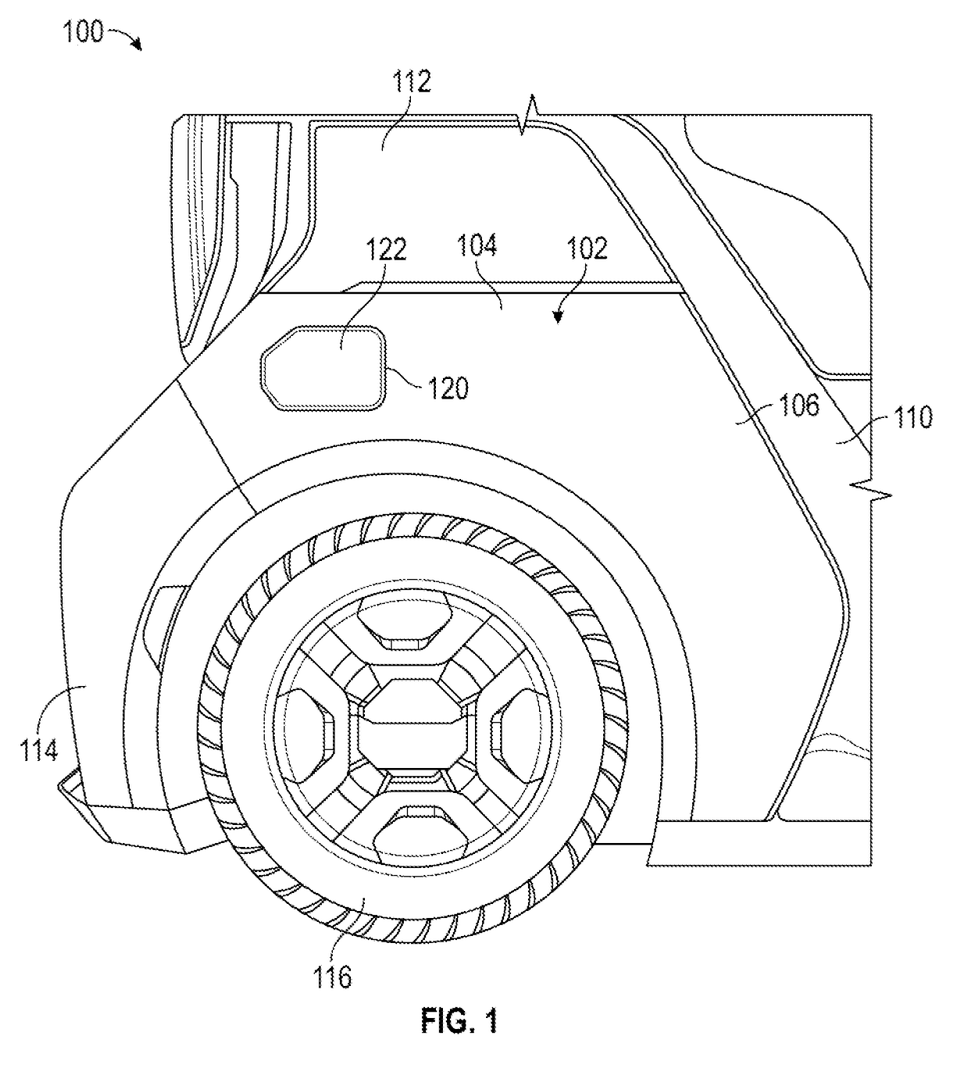
FIG. 1 is a partial view of a fender assembly for an electrified vehicle according to the present disclosure.
Figure 2:
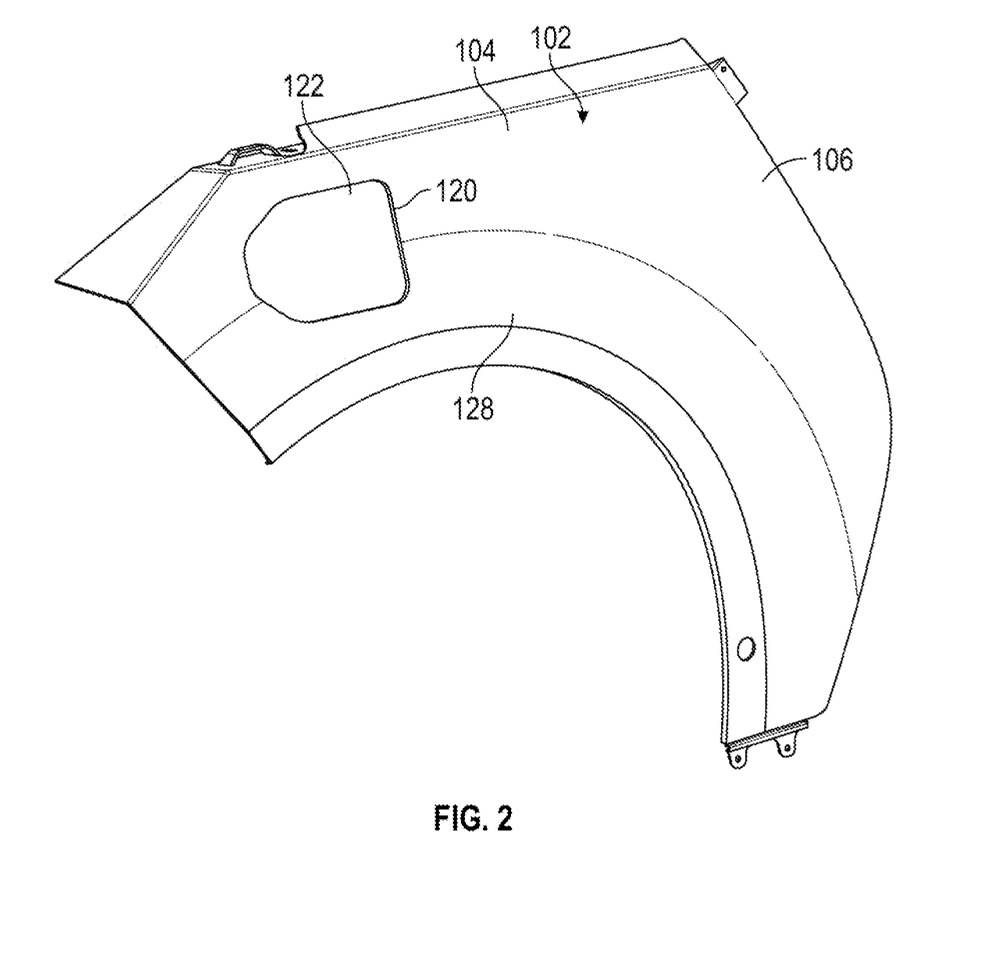
FIG. 2 is a front perspective view of the fender assembly.
Figure 3:
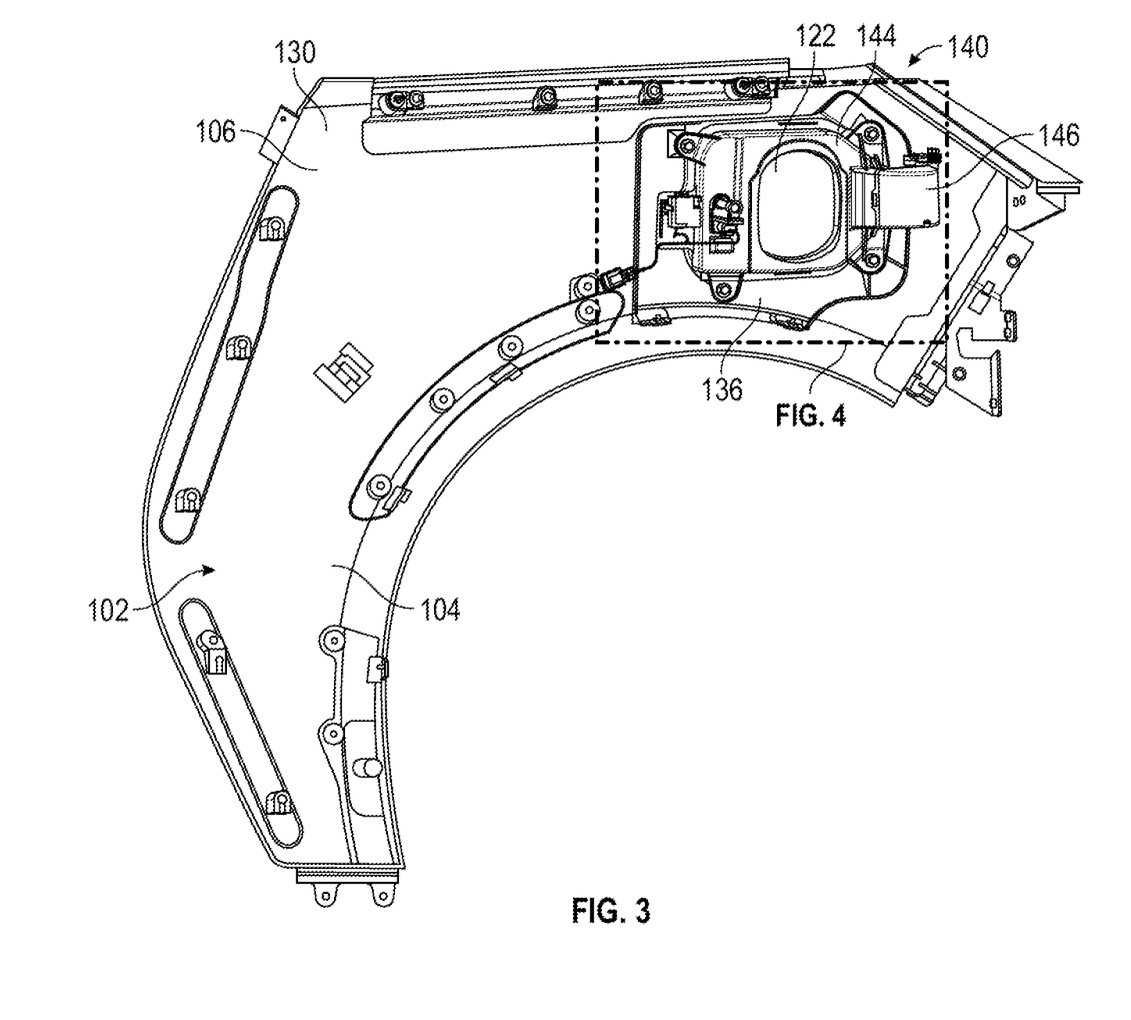
FIG. 3 is a rear perspective view of the fender assembly showing a charge port assembly mounted to an inner surface of a body of a fender.

Referring now to the drawings, wherein like numerals refer to like parts throughout the several views, FIG. 1 illustrates an electrified vehicle 100, for example, a plug-in hybrid electrified vehicle or a battery electrified vehicle, including a fender assembly 102. The fender assembly includes a fender 104 having a body 106. Peripheral members such as a vehicle door 110, a cover 112, a bumper 114, and a wheel 116 are arranged around the fender 104. The body 106 of the fender 104 defines a body opening 120 that is selectively opened and closed by a door 122. FIGS. 2 and 3 further depict the features of the fender assembly 102. The body 106 has an outer surface 128 and an inner surface 130 opposite the outer surface. The outer surface 128 defines an exterior of the vehicle 100. A stiffener 136 is secured to the inner surface 130 of the body 106 and located at the body opening 120 to provide strength and rigidity that that area of the fender body 106. For example, the stiffener 136 can be sonic welded to the inner surface 130 of the fender body 106. A charge port assembly 140 is also mounted to the inner surface 130 of the fender body 106 and located at the body opening 120, the body opening 120 defining an insertion port for a power feeding connector (not shown) and the door 122 defining a charge port door. The charge port assembly 140 including a bracket 144 mounted to the stiffener 136. The bracket 144 can be a hinge bracket that supports a hinge 146. The hinge 146 rotatably supports the door 122 on the fender assembly 102. Auxiliary electronic components 148, 150 operably associated with the charge port assembly 140 can be mounted to the bracket 144. For example, component 148 can be a charge indicator light and component 150 can be an actuator operable to maintain the door 122 in a closed position; although, it should be appreciated that alternative electronic components can be mounted to the bracket 144.

Figure 4:
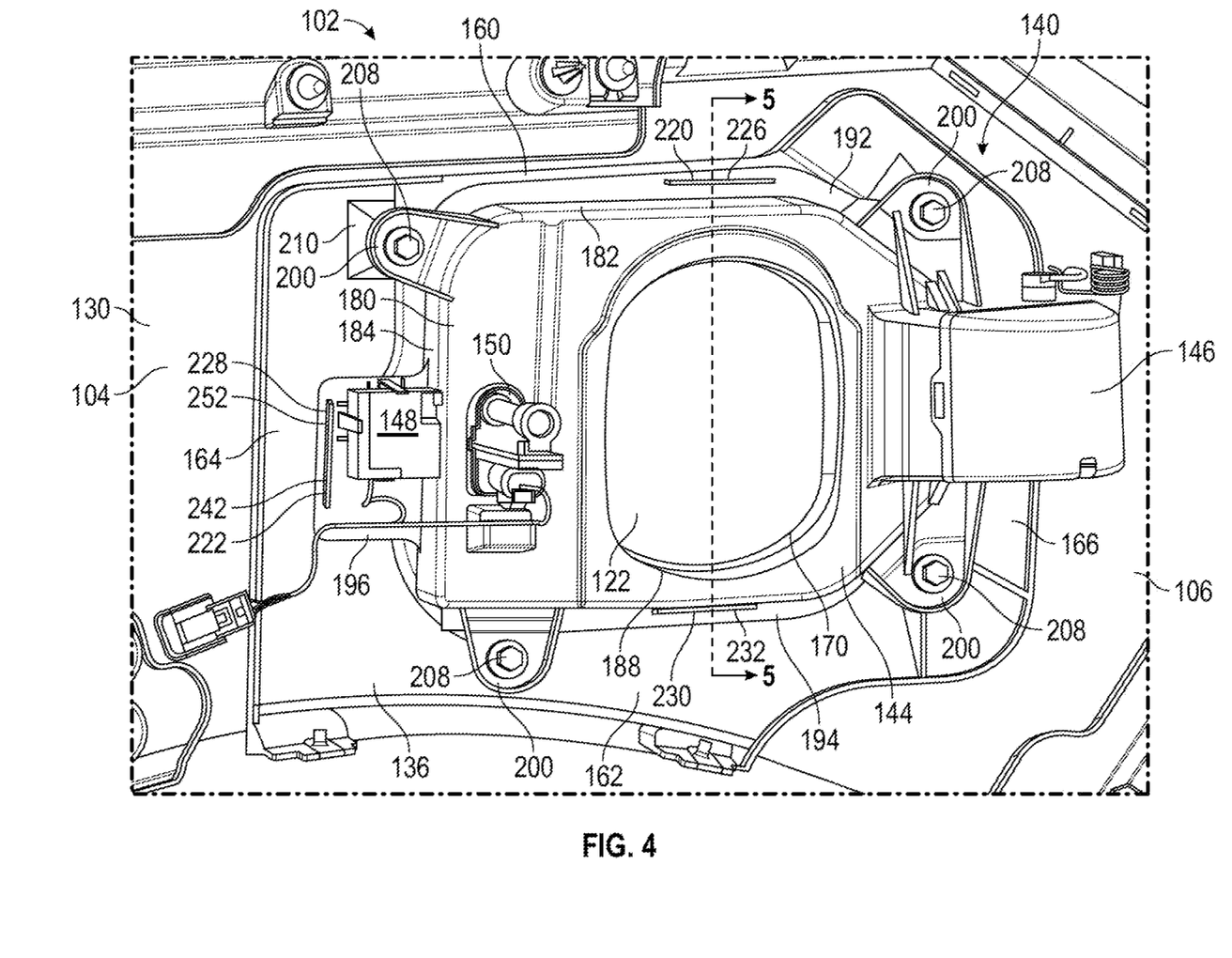
FIG. 4 is a detailed view of the charge port assembly of FIG. 3.
Figure 5:
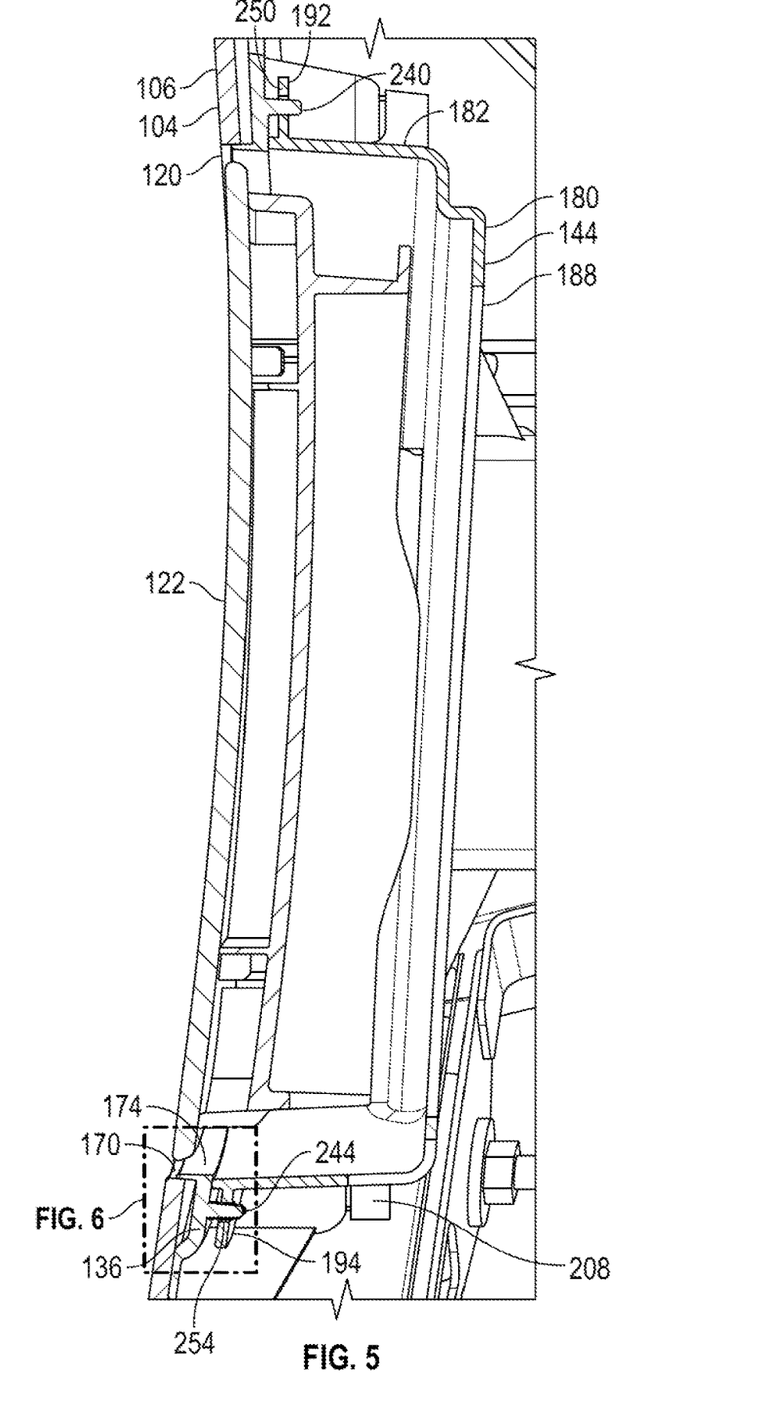
FIG. 5 is a cross-sectional view of FIG. 4 taken generally along line 5-5 of FIG. 4.
Figure 6:
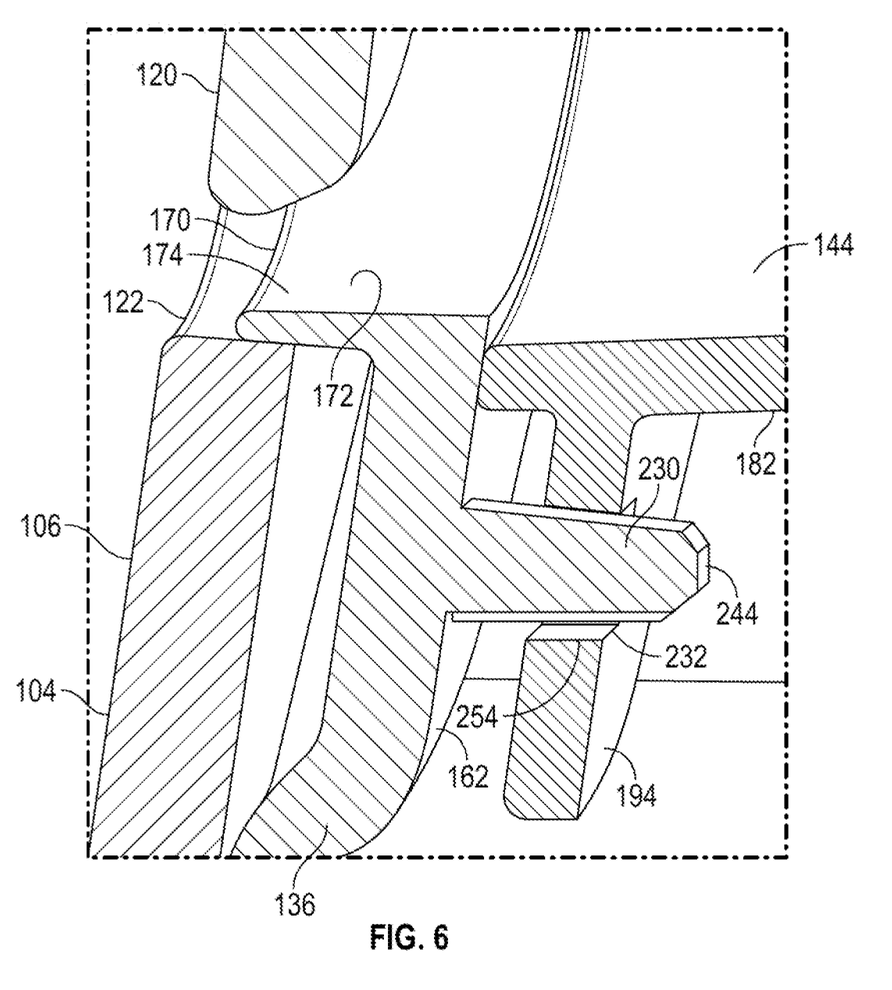
FIG. 6 is a detailed view of FIG. 5.

With references to FIGS. 4 and 5, the stiffener 136 includes a first side portion 160, a second side portion 162 opposite the first side portion, a first end portion 164, and a second end portion 166 opposite the first end portion. The side portions and end portions of the stiffener 136 frame a stiffener opening 170. The stiffener opening 170 is shaped and sized similarly to the body opening 120 so as not to impede access to the charge port assembly 140, and when mounted to the inner surface 130 the stiffener opening 170 is aligned with the body opening 120. In FIG. 6, to ensure proper mounting of the stiffener 136, the stiffener includes an inner surface 172 defining the stiffener opening 170, and the inner surface 172 is extended from the stiffener 136 via an alignment flange 174. With the shape of the stiffener opening 170 matching that of the body opening 120, the alignment flange 174 can be received in the body opening 120 to align the stiffener opening with the body opening. Once properly aligned, the stiffener 136 can be secured to the fender body 106.

In FIGS. 4 and 5, the 144 bracket of the charge port assembly 140 includes a base wall 180 and an outer sidewall 182, which can be extended along a periphery 184 of the base wall. The base wall includes a bracket opening 188 to be aligned with the stiffener opening 170, and the bracket opening is shaped and sized similarly to the stiffener opening 170 (and, in turn, the body opening 120) to provide good fit and finish between the fender 104 and the charge port assembly 140 for quality and appearance. In assembly, the base wall 180 is spaced from the stiffener 136 via the outer sidewall 182, with a first flange 192 and a second flange 194 opposite the first flange provided along the outer sidewall and extended over the respective first side portion 160 and second side portion 162 of the stiffener 136. A component flange 196 adapted to mount an associated component of the charge port assembly (for example, one of the auxiliary electronic components 148, 150) is extended from the outer sidewall 182 and over the first end portion 164 of the stiffener 136.

In the present disclosure, the body opening 120 of the fender 104 is not molded into the fender because such a molded opening can adversely affect appearance during molding process; instead, the body opening 120 is post-process punched (i.e., punched into the fender body 106 after the molding process). Because the body opening 120 is post process punched, the body opening will inherently have some positional tolerance on the fender 104. Therefore, it is necessary that the charge port assembly 140 always finds the punched body opening 120 on the fender for good fit and finish. In FIG. 4 the bracket 144 of the charge port assembly 140 is fastened to the stiffener 136 via fastener tabs 200 that project from the base wall 180. Each of the fastener tabs 200 includes a hole (not visible) for receiving an associated fastener 208 (for example, a screw or bolt), which threadingly engages, for example, a boss 210 provided on an inner surface of the stiffener 136. In the present disclosure, the bracket holes are over-sized relative to the fasteners (for example, a diameter of the bracket hole is at least one and a half times an outer diameter of the fastener 208) to allow for charge port assembly float and resulting positional movement of the charge port assembly 140 on the fasteners 208 relative to the body opening 120 (as framed by the stiffener opening 170). This fastened arrangement allows for very easy serviceability of the charge port assembly 140, as compared to a typical welded attachment of known charge port assembly. As stated above, the stiffener 136 is secured to the fender body 106. However, it should be appreciated that the stiffener 136 can be adapted to be fastened to the fender body 106, for example via the fasteners 208 extending through stiffener holes and threading engaging bosses provided on the inner surface 130 of the body 106. With this alternative arrangement, the stiffener holes for the fasteners 208 can also be over-sized to allow for stiffener float and resulting positional movement of the stiffener 136 on the fasteners 208 relative to the body opening 120 to ensure proper positioning of the alignment flange 174.

To accommodate positional tolerances provided by the charge port assembly float, the stiffener 136 includes at least one stiffener locating feature and the bracket 144 includes at least one bracket locating feature adapted to mate with the at least one stiffener feature to ensure proper placement of the bracket 144 on the stiffener 136 relative to the body opening 120. In the depicted aspect, the at least one stiffener locating feature includes a first stiffener locating feature 220 provided along one of the first side portion 160 and second side portion 162 of the stiffener, for example, the first side portion 160. The at least one stiffener locating feature can further includes a second stiffener locating feature 222 provided along the first end portion 164 of the stiffener. The at least one bracket locating feature includes a first bracket locating feature 226 and a second bracket locating feature 228 adapted to mate with the corresponding first stiffener locating feature 220 and the second stiffener locating feature 222. With the first stiffener locating feature 220 located on the first side portion 160, the first bracket locating feature can be located on the first flange 192, and with the second stiffener locating feature 222 located on the first end portion 164, the second bracket locating feature 228 can be located on the component flange 196. In the present aspect, the first stiffener locating feature 220 is extended in a first direction on the stiffener 136 and the second stiffener locating feature 222 is extended in a second direction on the stiffener 136 to provide two directional locators on the fender assembly 102 to ensure proper placement of the bracket 144 on the stiffener 136 relative to the body opening 120. By way of example, the second stiffener locating feature 222 is oriented substantially perpendicular to the first stiffener locating feature 220.

As shown in FIG. 4, the at least one stiffener locating feature can further includes a third stiffener locating feature 230 provided along the other of the first side portion 160 and second side portion 162 of the stiffener, for example, the second side portion 162. The at least one bracket locating feature can further include a third bracket locating feature 232 adapted to mate with the third stiffener locating feature 230. With the third stiffener locating feature 230 located on the second side portion 162, the second bracket locating feature can be located on the second flange 194. As shown, the third stiffener locating feature 230 is oriented substantially parallel to the first stiffener locating feature 220 and substantially perpendicular to the second stiffener locating feature 222; although, this is not required.

In the depicted aspect of FIGS. 4-6, the first stiffener locating feature 220 is defined by a first rib 240, the second stiffener locating feature 222 is defined by a second rib 242, and the third stiffener locating feature 230 is defined by a third rib 244. Each of the ribs is integrally formed on the stiffener 136 so as to extend outward from the stiffener. In the depicted aspect, the first bracket locating feature 226 is defined by a first slot 250, the second bracket locating feature 228 is defined by a second slot 252, and the third bracket locating feature 232 is defined by a third slot 254.

Each of the first, second and third slots are sized to receive the respective first, second and third ribs, with minimal play or movement of the ribs within the slots. This dimensional arrangement substantially removes the positional tolerances provided by the charge port assembly float, thereby ensuring proper alignment of the bracket opening 188 with the body opening 120 of the fender 104 and fine tuning the fit and finish of the fender assembly 100. Further, at least one of the ribs defining the corresponding stiffener locating feature can be substantially wedge shaped for engaging an inner surface of the bracket 144 defining the corresponding slot of the bracket locating feature. In FIGS. 5 and 6, each of the first and third ribs 240, 244 are substantially wedge shaped, and it should be appreciated that the second rib 242 can be similarly shaped. It should be appreciated that alternative configurations for the stiffener and bracket locating features are contemplated. By way of example, the stiffener locating features can be defined by slots formed in the stiffener 136 and the bracket locating features can be defined by ribs formed on the bracket 144. In addition, in the embodiment where the stiffener locating features are the above described ribs, the bracket locating features can be defined by substantially U-shaped channels formed in the bracket 144 and sized to receive the stiffener ribs.

Accordingly, the present disclosure provides a positional interface between stiffener 136 and the charge port assembly 140 that guarantee the charge port assembly always finds the punched body opening 120 on the fender 104 for good fit and finish of the fender assembly 102. As indicated previously, the fastener tabs 200 of the bracket 144 apply over-sized holes to allow for charge port assembly float, which allows for easy serviceability of the fender assembly 102, much easier than a typical welded assembly. And the bracket 144 finds the body opening 120 via the tunable ribs of the stiffener locating features received in the corresponding slots of the bracket locating features in order to fine tune fit and finish detail.

As is evident from the foregoing, a method for assembling a charge port assembly 140 on a vehicle fender 104 is provided. The exemplary method comprises providing the fender 102; punching an opening 120 through a body 106 of the fender; providing a stiffener 136 having a stiffener opening 170 and positioning the stiffener on an inner surface 130 of the fender body 106 such that the stiffener opening 170 is aligned with the fender body opening 120, wherein the stiffener includes stiffener locating features 220, 222, 232; securing the stiffener to fender body (for example, by sonic welding); providing a bracket 144 of the charge port assembly 140, the bracket 140 having a bracket opening 188 and bracket locating features 226, 228, 232; positioning the bracket 144 on the stiffener 136 such that the bracket locating features mate with the corresponding stiffener locating features and the bracket opening 188 is aligned with the stiffener opening 170; and securing the bracket 144 to the stiffener 136 (for example, by the fasteners 208).

As indicated above, the stiffener 136 includes an inner surface 172 defining the stiffener opening 170, the inner surface 172 extended from the stiffener via an alignment flange 174. The exemplary method step of aligning the stiffener opening 170 with the fender body opening 120 includes positioning the alignment flange 174 within the fender body opening 120. The stiffener locating features can be defined by ribs 240, 242, 244, and the bracket locating features can be defined by slot 250, 252, 254, and the exemplary method includes positioning the ribs in the respective slots to fine tune fit and finish of the fender assembly 102.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A fender assembly for a vehicle comprising:
a fender including a body having an outer surface and an inner surface opposite the outer surface, the body defines a body opening;
a stiffener mounted to the inner surface of the body and located at the body opening, the stiffener includes stiffener holes sized to receive associated fasteners; and
a charge port assembly including a bracket mounted to the stiffener, the bracket includes bracket holes sized to receive the associated fasteners, wherein the bracket holes are over-sized relative to the associated fasteners to allow for positional movement of the charge port assembly on the associated fasteners relative to the body opening,
wherein the stiffener includes at least one stiffener locating feature and the bracket includes at least one bracket locating feature adapted to mate with the at least one stiffener locating feature to ensure proper placement of the bracket on the stiffener relative to the body opening,
wherein the at least one stiffener locating feature includes first and second stiffener locating features and the at least one bracket locating feature includes corresponding first and second bracket locating features adapted to mate with the respective first and second stiffener locating features,
wherein at least one of the first stiffener locating feature and the second stiffener locating feature is defined by a rib, and the corresponding one of the first bracket locating feature and the second bracket locating feature is defined by a slot sized to receive the rib.

2. The fender assembly of claim 1, wherein stiffener includes a first side portion, a second side portion opposite the first side portion, a first end portion, and a second end portion opposite the first end portion, the stiffener includes a stiffener opening aligned with the body opening, the first stiffener locating feature provided along the first side portion and the second stiffener locating feature provided along the second side portion.

3. The fender assembly of claim 2, wherein the bracket includes a bracket opening aligned with the stiffener opening.

4. The fender assembly of claim 3, wherein the bracket includes a base wall and an outer sidewall extended along a periphery of the base wall, the base wall includes the bracket opening, a first flange and a second flange opposite the first flange are provided along the outer sidewall, the first flange and the second flange extended along the respective first side portion and second side portion of the stiffener, the first bracket locating feature located on the first flange and the second bracket locating feature located on the second flange.

5. The fender assembly of claim 3, wherein the first stiffener locating feature is defined by a first rib and the second stiffener locating feature is defined by a second rib, and the first bracket locating feature is defined by a first slot sized to receive the first rib and the second bracket locating feature is defined by a second slot sized to receive the second rib.

6. The fender assembly of claim 3, wherein the at least one stiffener locating feature includes a third stiffener locating feature provided along the first end portion of the stiffener, and the at least one bracket stiffener includes a third bracket locating feature adapted to mate with the third stiffener locating feature.

7. The fender assembly of claim 6, wherein the third stiffener locating feature is oriented substantially perpendicular to the first and second stiffener locating features.

8. The fender assembly of claim 6, wherein the third stiffener locating feature is defined by a rib, and the third bracket locating feature is defined by a slot sized to receive the rib.

9. The fender assembly of claim 6, wherein the bracket includes a component flange adapted to mount an associated component of the charge port assembly, and the third bracket locating feature is located on the component flange.

10. The fender assembly of claim 2, wherein the stiffener includes an inner surface defining the stiffener opening, the inner surface extended from the stiffener via an alignment flange, the alignment flange received in the body opening to align the stiffener opening with the body opening.

11. The fender assembly of claim 1, wherein the first stiffener locating feature is extended in a first direction on the stiffener and the second stiffener locating feature is extended in a second direction on the stiffener which is oriented substantially perpendicular to the first direction.

12. A fender assembly for a vehicle comprising:
a fender including a body having an outer surface and an inner surface opposite the outer surface, the body defines a body opening;
a stiffener mounted to the inner surface of the body and located at the body opening, the stiffener includes a first side portion, a second side portion opposite the first side portion, a first end portion, and a second end portion opposite the first end portion, the stiffener includes a stiffener opening aligned with the body opening; and
a charge port assembly including a bracket mounted to the stiffener, the bracket includes a base wall and an outer sidewall extended along a periphery of the base wall, the base wall includes a bracket opening aligned with the stiffener opening,
wherein the stiffener includes first and second stiffener locating features and the bracket includes corresponding first and second bracket locating features adapted to mate with the first and second stiffener locating features, the first stiffener locating feature extended in a first direction on the stiffener and the second stiffener locating feature extended in a second differing direction on the stiffener to provide two directional locators on the fender assembly to ensure proper placement of the bracket on the stiffener relative to the body opening,
wherein the stiffener includes an inner surface defining the stiffener opening, the inner surface extended from the stiffener via an alignment flange, the alignment flange received in the body opening to align the stiffener opening with the body opening.

13. The fender assembly of claim 12, wherein the first stiffener locating feature is provided along the first side portion and the second stiffener locating feature is provided along the first end portion.

14. The fender assembly of claim 13, wherein the first stiffener locating feature is defined by a first rib and the second stiffener locating feature is defined by a second rib, and the first bracket locating feature is defined by a first slot sized to receive the first rib and the second bracket locating feature is defined by a second slot sized to receive the second rib.

15. The fender assembly of claim 13, wherein at least one of the first stiffener locating feature and the second stiffener locating feature is substantially wedge shaped for engaging an inner surface of the bracket defining a corresponding one of the first bracket locating feature and the second bracket locating feature.

16. The fender assembly of claim 13, wherein the stiffener includes stiffener holes and the bracket includes bracket holes, each of the stiffener and bracket holes sized to receive associated fasteners, wherein the bracket holes are oversized relative to the associated fasteners to allow for positional movement of the charge port assembly on the associated fasteners relative to the body opening.

* * * * *